(12) United States Patent  
Higashi

(10) Patent No.: US 6,578,866 B2
(45) Date of Patent: Jun. 17, 2003

(54) AIR BAG APPARATUS

(75) Inventor: Yosuke Higashi, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 10/222,143

(22) Filed: Aug. 16, 2002

(65) Prior Publication Data

US 2002/0190509 A1 Dec. 19, 2002

Related U.S. Application Data

(62) Division of application No. 09/616,435, filed on Jul. 14, 2000.

(30) Foreign Application Priority Data

Jul. 16, 1999 (JP) ............................. 11-203023
Dec. 3, 1999 (JP) ............................. 11-345416

(51) Int. Cl.$^7$ ....................... B60R 21/16; B60R 21/22
(52) U.S. Cl. ................................. 280/728.2; 280/730.2
(58) Field of Search ........................ 280/730.2, 743.1, 280/728.2, 730.1

(56) References Cited

U.S. PATENT DOCUMENTS 5,558,362 A * 9/1996 Acker et al. ............. 280/728.2
5,560,645 A * 10/1996 Lewis et al. ............. 280/728.2
5,570,905 A * 11/1996 Dyer ....................... 280/743.1
5,632,506 A * 5/1997 Shellabarger ............ 280/743.1
5,944,342 A * 8/1999 White et al. ............. 280/743.1
5,997,036 A * 12/1999 Hamada ................... 280/743.1
6,142,507 A * 11/2000 Okuda et al. ............ 280/743.1

FOREIGN PATENT DOCUMENTS

JP    1016690 A  *  1/1998   .......... B60R/21/20
JP    1053081 A  *  2/1998   .......... B60R/21/16
JP    11115673       4/1999

* cited by examiner

Primary Examiner—Paul N. Dickson
Assistant Examiner—Joselynn Y. Sliteris
(74) Attorney, Agent, or Firm—Dann, Dorfman, Herrell and Skillman, P.C.

(57) ABSTRACT

The invention provides an air bag apparatus which can securely prevent gas generated from an inflator from leaking from an insertion port of the air bag provided in a mounting base portion of the air bag. The air bag apparatus has a gas generating inflator (2) for expanding and developing an air bag (1) assembled in an inner portion from an insertion port (1c) provided in a mounting base portion (1b) of the air bag (1), the inflator (2) is received inside within the air bag (1), an internal contact fabric (4) for closing the insertion port (1c) of the air bag (1) from the inner side is provided for preventing a gas leakage, and an external contact fabric (5) is provided for reinforcing the bag mounting base portion (1b).

8 Claims, 14 Drawing Sheets

DEVELOPING DIRECTION

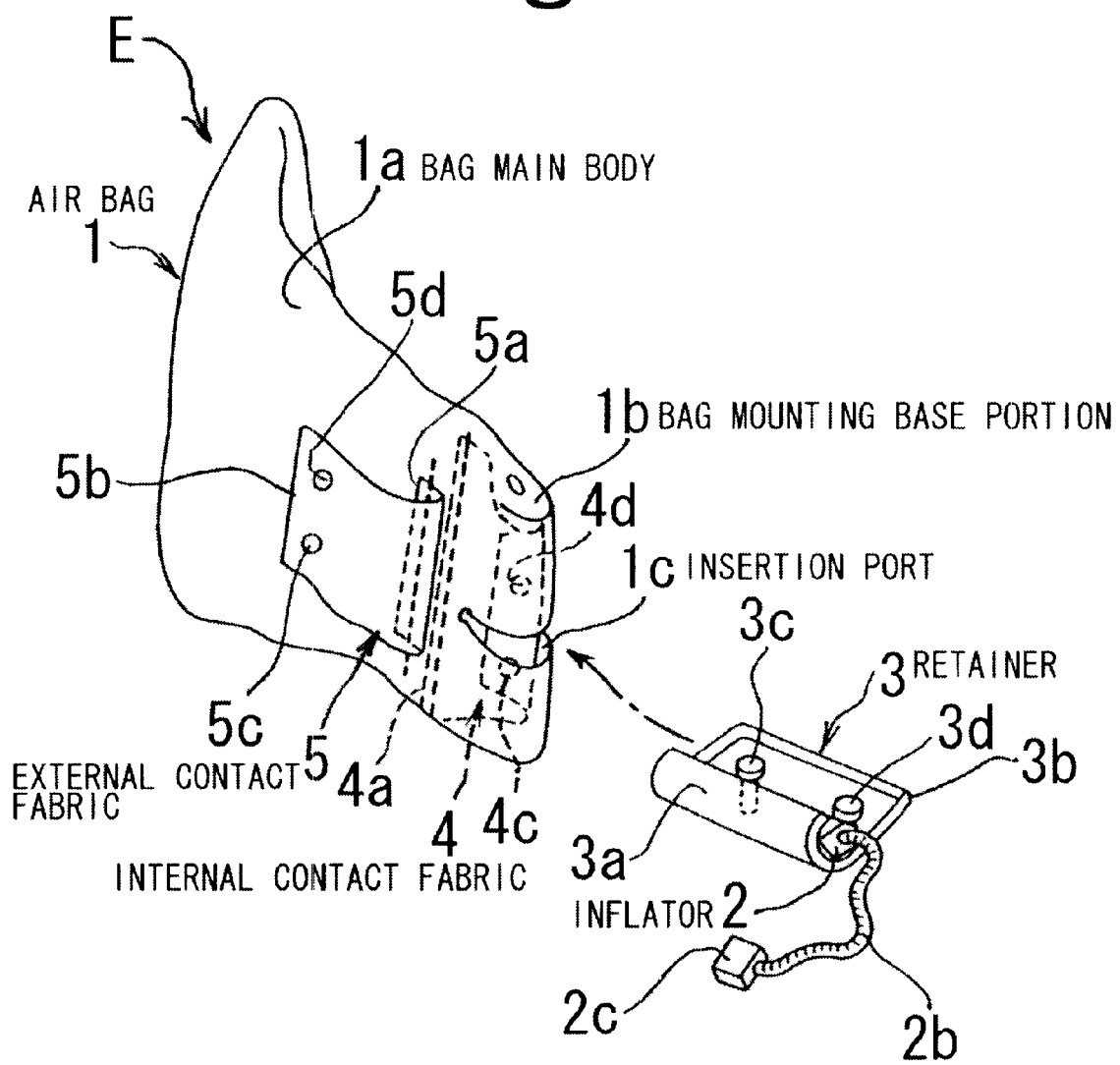

DEVELOPING DIRECTION

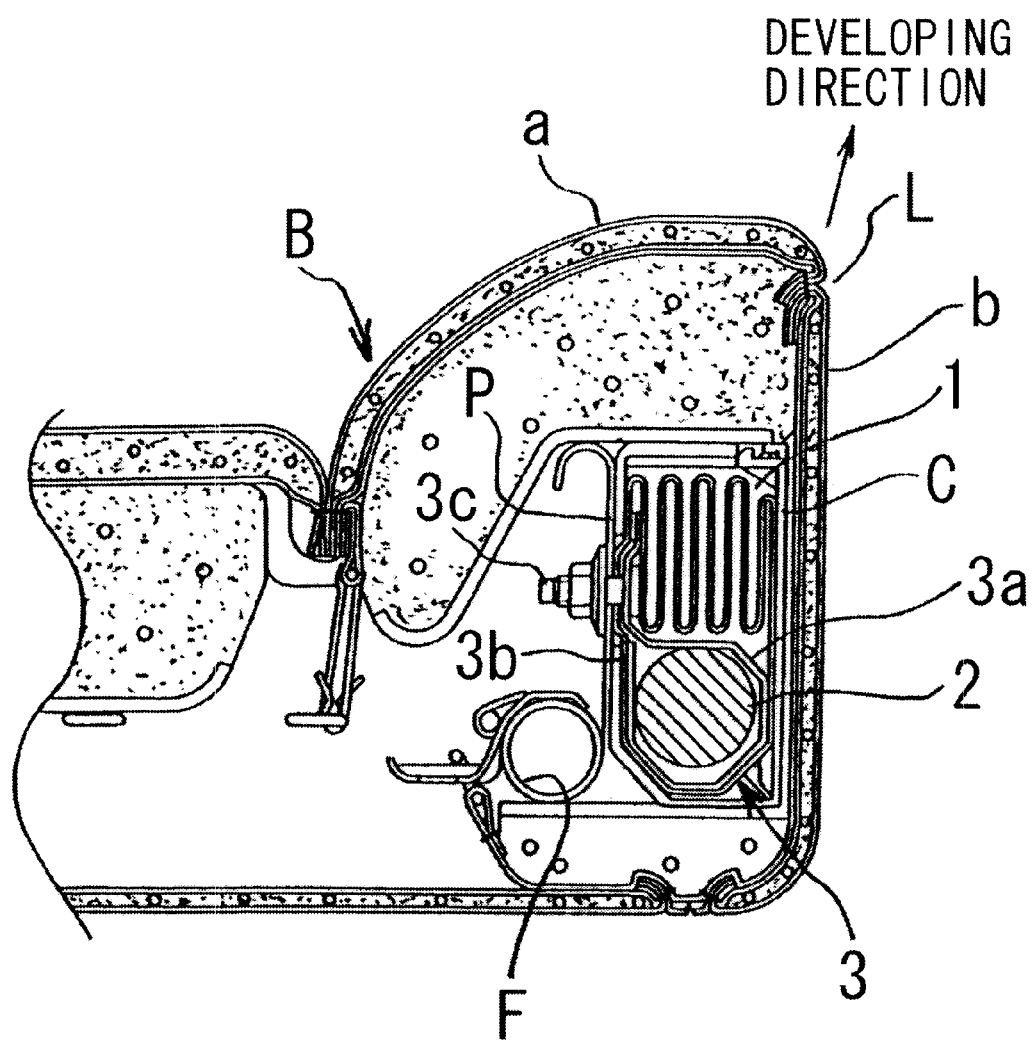

AIR BAG APPARATUS

This application is a divisional of U.S. application Ser. No. 09/616,435, filed Jul. 14, 2000.

BACKGROUND OF THE INVENTION

1. Field of the Invention

The present invention relates to an air bag apparatus in which a gas generating inflator for expanding and developing an air bag is assembled in an inner portion of the air bag apparatus from an insertion port provided in a mounting base portion of the air bag, and mainly to an improvement of an air bag structure which prevent the gas generated from the inflator from leaking from the insertion port in the mounting base portion.

2. Description of the Prior Art

As an air bag apparatus for protecting a passenger, there has been known a structure made such that a gas generating inflator for expanding and developing an air bag is assembled in an inner portion of the air bag apparatus from an insertion port provided in a mounting base portion of the air bag and a closing fabric for covering the insertion port of the inflator is provided in an outer side of the air bag, thereby preventing the gas generated from the inflator for expanding and developing the air bag from leaking from the insertion port of the mounting base portion (Japanese Patent Application Laid-Open No. 11-115673).

In the air bag apparatus, since the structure is made such that the insertion port of the inflator is covered with the closing fabric from the outer side of the air bag, the gas generated from the inflator operates toward the closing fabric from the insertion port of the mounting base portion and the closing fabric expands in a direction of moving apart from an outer side surface of the air bag, whereby it is impossible to completely prevent the gas leakage.

In the air bag apparatus, in addition to the closing fabric, the structure is made such that a reinforcing fabric having a slit corresponding to the insertion port of the mounting base portion is provided in an inner side of the air bag, however, it is impossible to prevent the gas generated from the inflator from operating toward the closing fabric from the insertion port of the mounting base portion.

SUMMARY OF THE INVENTION

A main object of the present invention is to provide an air bag apparatus which can securely prevent gas generated from an inflator from leaking from an insertion port provided in a mounting base portion of an air bag.

Further, another object of the present invention is to provide an air bag apparatus in which an inflator can be easily assembled in an inner portion of an air bag so as to securely prevent gas leakage.

In addition, the other object of the present invention is to provide an air bag apparatus in which an air bag can be folded in such a manner as to be expandable so as to be mounted in a compact manner with a reduced number of parts.

Further, the other object of the present invention is to provide an air bag apparatus in which an air bag can be securely put together in such a manner as to be expandable and developable.

BRIEF DESCRIPTION OF THE DRAWINGS

FIG. 5a is a schematic view showing the air bag apparatus in accordance with the present invention in correspondence to an assembling step of the inflator;

FIG. 14 is a schematic view showing the air bag apparatus in accordance with the present invention in a state of being assembled in an inner portion of a seat back.

DESCRIPTION OF THE PREFERRED EMBODIMENTS

Figure 1:
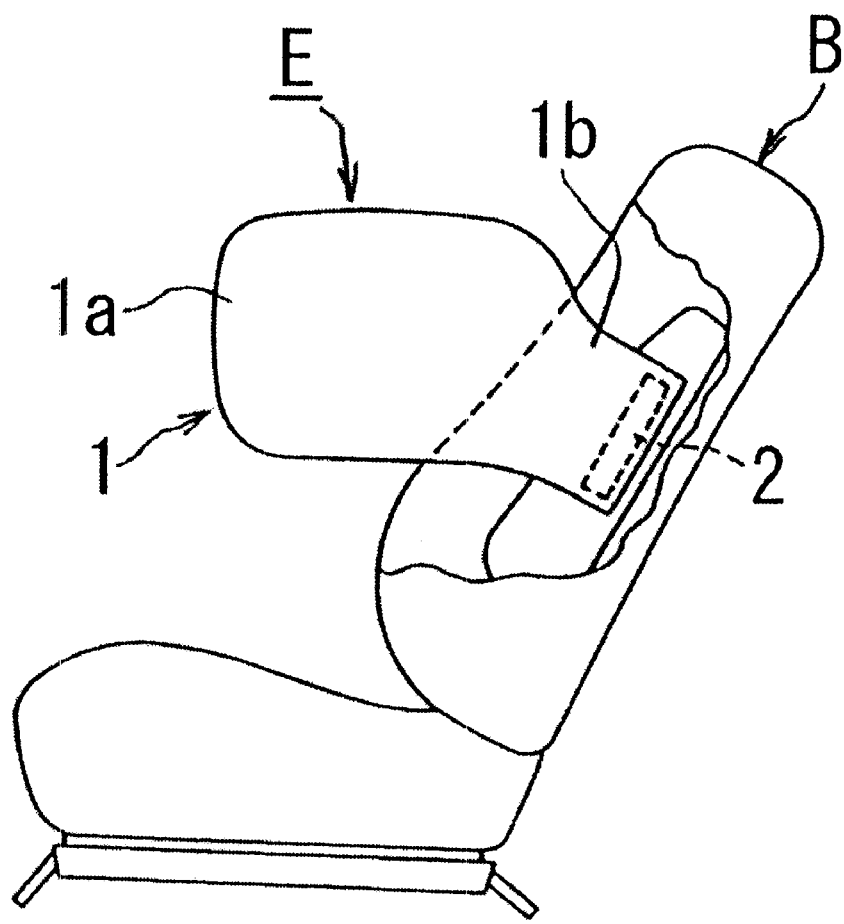
FIG. 1 is a partly notched side elevational view showing a seat for an automobile provided with an air bag apparatus in accordance with the present invention in a state that an air bag is expanded and developed.
Figure 2:
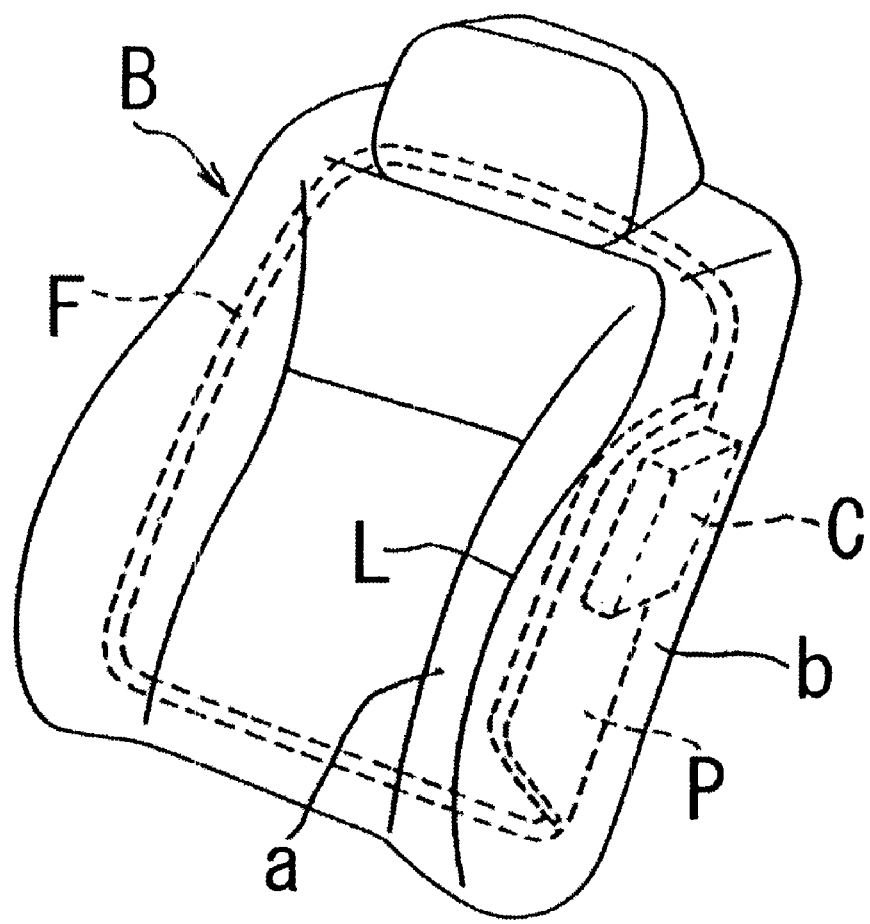
FIG. 2 is a perspective view showing a seat back of the automobile seat provided with the air bag apparatus in accordance with the present invention.

A description will be given below of an embodiment in accordance with the present invention with reference to the accompanying drawings. The embodiment is illustrated as a structure constituting an air bag apparatus E provided in a left side of a seat back B in an assistant seat as shown in FIGS. 1 and 2.

The air bag apparatus E is provided with an air bag case C capable of being opened due to an expansion pressure of an air bag 1, receives the air bag 1 in an inner portion of the air bag case C in a state of folding the air bag 1 in an expandable and developable manner, and is mounted in an inner portion of the seat back B by screwing and fastening the air back case C to a side plate P of a seat back frame F by bolts.

Further, the air bag apparatus is mounted in a state that a sewing portion L between a front surface cover portion a and a side surface cover portion b in a seat cover for covering a bank portion of the seat back B is formed as a breaking portion of the seat cover together with an expansion and development of the air bag 1.

Figure 3:
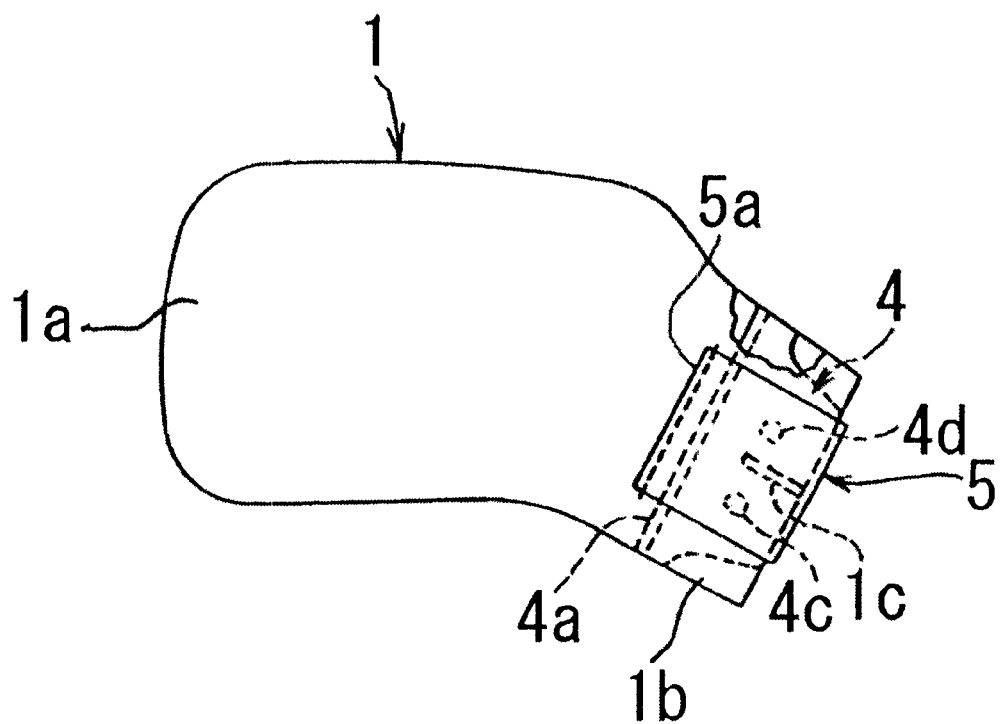
FIG. 3 is a partly notched side elevational view showing the air bag of the air bag apparatus in accordance with the present invention in an expanded and developed state.

The air bag 1 is formed by sewing a bag main body 1a folded in such a manner as to be capable of expanding and developing and a bag mounting base portion 1b relatively narrower than the bag main body 1a as shown in FIG. 3 so as to totally show a bag shape. In the air bag 1, an insertion port 1c used for assembling an inflator 2 mentioned below in an inner portion of the air bag is provided in the bag mounting base portion 1b. The insertion port 1c of the air bag 1 is formed by a slit extending both surfaces of the mounting base portion 1b toward the bag main body 1a from a substantially center portion of the bag mounting base portion 1b, or the like.

Figure 4:
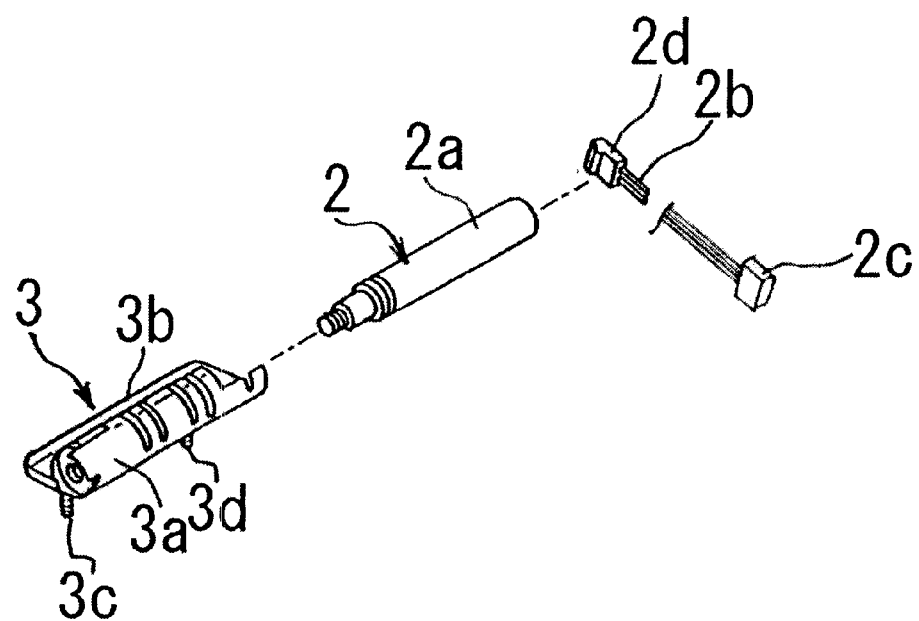
FIG. 4 is an exploded perspective view showing an inflator and a retainer of the air bag apparatus in accordance with the present invention.

An inflator 2 shown in FIG. 4 is assembled in an inner portion of the bag mounting base portion 1b. The inflator 2 is structured such as to generate gas required for expanding and developing the air bag 1 from an inflator main body 2a, and is constituted by a harness 2b and a connector 2c required for forming a circuit with respect to a relational device such as an impact sensor or the like. Among them, the harness 2b is drawn out to and arranged in an outer portion of the air bag 1 by being connected to the inflator main body 2a via an insertion hole (not shown) provided in a side portion of the air bag 1 by means of a connector 2d.

The inflator 2 is held by the retainer 3 and assembled in the inner portion of the air bag 1. The retainer 3 is constituted by a substantially cylindrical holder portion 3a for fitting and holding the inflator main body 2a, a base plate portion 3b corresponding to a placing plate, and fastening bolts 3c and 3d stood from and provided on the base plate portion 3b (hereinafter, refer to as "fastening bolts for the retainer"). The fastening bolts 3c and 3d for the retainer 3 are set to be a stationary shaft for the inflator 2, and a through hole extending through the fastening bolts 3c and 3d is provided on a bottom surface of the air bag case and a side surface of the mounting base portion 1b.

An internal contact fabric 4 for receiving the inflator 2 inside by the inner portion of the air bag 1 and closing the insertion port 1c for the inflator 2 from an inner side is provided as shown in FIG. 5a so as to prevent the gas generated from the inflator 2 from leaking from the insertion port 1c of the air bag 1 provided in the bag mounting base portion 1b (additionally refer to FIG. 3). The internal contact fabric 4 can be formed by a fabric material which is the same as that of the air bag 1 and does not generate gas leakage.

The internal contact fabric 4 is formed in a web shape which is at least longer than the insertion port 1c extending to both surfaces of the mounting base portion 1b toward a direction of the bag main body 1a from a substantially center portion of the bag mounting base portion 1b. In the illustrated embodiment, one end portion 4a is formed to be wide and one end portion 4a is sewed along a width direction, thereby being sewed on the inner surface of the air bag 1. Further, the other end portion 4b is formed as a free end for receiving the inflator 2 inside together with the retainer 3.

Since the internal contact fabric 4 receives the inflator 2 inside together with the retainer 3, the internal contact fabric 4 is provided in such a manner as to engage the free end 4b with the bolts 3c and 3d of the retainer 3 in the inner portion of the air bag 1 so as to cover the insertion port 1c of the air bag 1 and be expanded on the inner surface of the bag mounting base portion 1b. Through holes 4c and 4d engaged with the fastening bolts 3c and 3d of the retainer 3 are provided within a surface close to an end portion of the free end 4b.

In addition to the internal contact fabric 4, there is provided an external contact fabric 5 for surrounding the mounting base portion 1b of the air bag 1 between both side surfaces from the outer side. The external contact fabric 5 is formed by the same fabric material as that of the air bag 1 or other strong material, and is pressed by the retainer 3 together with the internal contact fabric 4 so as to stand against an expansion pressure of the air bag main body 1a and assembled and fixed to the inner portion of the air bag case, thereby being provided for reinforcing the bag mounting base portion 1b.

The external contact fabric 5 is also structured such that one end portion 5a is sewed on the outer surface of the air bag 1, and the other end portion 5b surrounds the mounting base portion 1b of the air bag 1 between both side surfaces from the outer side and engaged with and fixed to the fastening bolts 3c and 3d of the retainer 3 protruding to the outer portion from the inner portion of the air bag 1. Through holes 5c and 5d for being engaged with the fastening bolts 3c and 3d of the retainer 3 are also provided within a surface of the other end portion 5b.

In order to construct the air bag apparatus E from the respective portions, as shown in FIG. 5a, the inflator 2 is held by the holder portion 3a of the retainer 3 and is inserted into the inner portion of the air bag 1 from the insertion port 1c of the air bag except the harness 2b and the connector 2c. At this time, the inflator 2 may be inserted to a back side of the air bag 1 by moving below a lower side of the internal contact fabric 4 from the free end 4b thereof together with the retainer 3, the surface close to the end portion of the free end 4b may be moved to the bottom surface side of the base plate portion 3b, and the fastening bolts 3c and 3d of the retainer 3 may be inserted to a through hole (not shown) of the air bag 1 from the through holes 4c and 4d of the internal contact fabric 4 so as to be protruded outward.

Figure 5B:
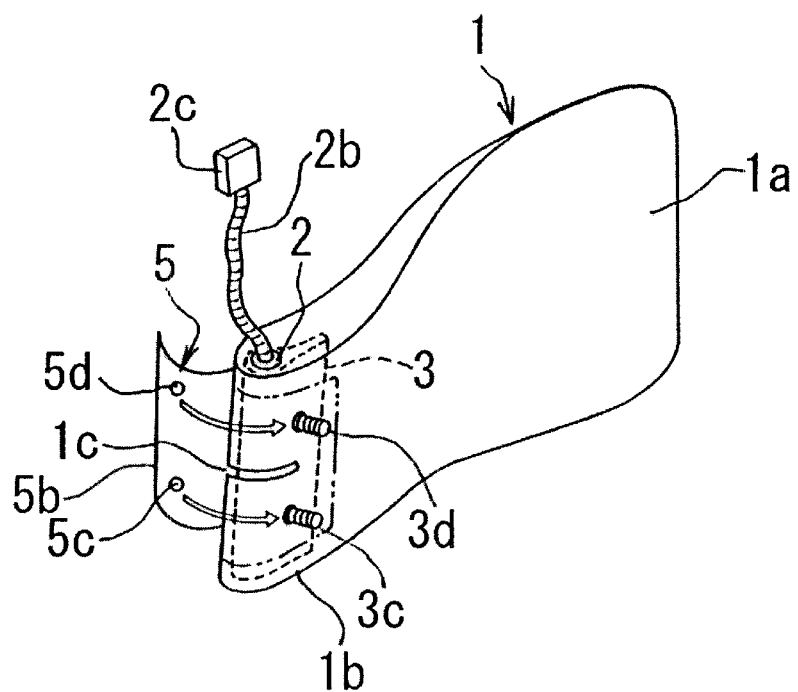
FIG. 5b is a schematic view showing the air bag apparatus in accordance with the present invention in correspondence to an assembling step of an external contact fabric.

In a state that the inflator 2 is assembled in the inner portion of the air bag 1 together with the retainer 3, the harness 2b may be later connected to the inflator main body 2a from the outer side of the air bag 1 as shown in FIG. 5b. Further, the external contact fabric 5 may surround the bag mounting base portion 1b between both side surfaces from the outer side by means of one end portion 5a sewed to the outer side surface of the air bag 1 and may engage and fix the other end portion 5b to the fastening bolts 3a and 3b of the retainer 3 protruding from the inner portion of the air bag 1 to the outer portion by the through holes 5c and 5d.

Figure 5C:
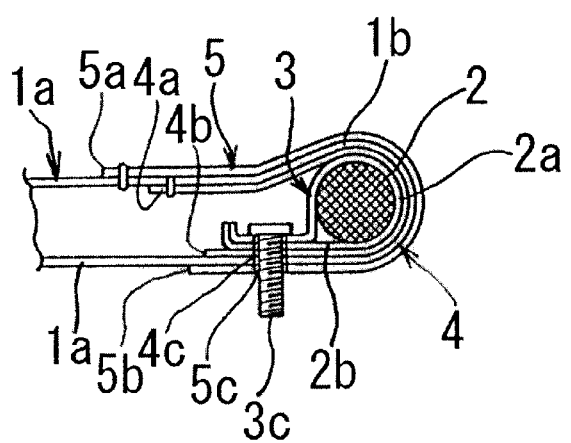
FIG. 5c is a partly cross sectional view showing the air bag apparatus in accordance with the present invention in correspondence to an assembling state of respective parts.

In the air bag apparatus structured in this manner, as shown in FIG. 5c, the inflator 2 is held by the retainer 3 and is easily assembled so as to be received inside from the free end 4b of the internal contact fabric 4 by the inner portion of the air bag 1. Further, the insertion port 1c of the inflator 2 is closed by the internal contact fabric 4 provided along the inner surface of the bag mounting base portion 1b from the inner side.

The internal contact fabric 4 is provided inside the air bag 1 and an expansion pressure is applied to the internal contact fabric 4, whereby the internal contact fabric 4 is pressure contact to the inner side surface of the bag mounting base portion 1b. Accordingly, it is possible to completely seal the insertion port 1c of the inflator 2 and it is possible to prevent the gas generated from the inflator 2 from leaking.

Since the internal contact fabric 4 is structured such that one end portion 4a is sewed on the inner surface of the air bag 1 and the other end portion 4b receiving the inflator 2 inside and corresponding to the free end is engaged with the fastening bolts 3c and 3d of the retainer 3 within the air bag 1, it is possible to prevent a position shift caused by an assembly of the inflator 2 and an application of the expansion pressure of the air bag 1 and it is possible to securely close the insertion port 1c of the inflator 2 from the inner side.

In addition, since the internal contact fabric 4 mentioned above receives the retainer 3 for holding the inflator 2 in the inner side thereof and is brought into contact with and fixed to the inner portion of the air bag case together with the bag mounting base portion 1b by the base plate portion 3b of the retainer 3, the internal contact fabric 4 can be pressed from the inner side between the holder portion 3a and the base plate portion 3b in the retainer 3 and can be tensioned to the inner surface of the bag mounting base portion 1b so as to securely cover the insertion port 1c of the inflator 2.

In this air bag apparatus, since the external contact fabric 5 for surrounding the mounting base portion 1b of the air bag 1 from the outer side is provided for reinforcing the bag mounting base portion 1b, the bag mounting base portion 1b can be pressed and fixed together with the internal contact fabric 4 by the retainer 3 so as to stand against the expansion pressure of the bag main body 1a.

Since the external contact fabric 5 is structured such that one end portion 5a is sewed to the outer side surface of the air bag 1 and the other end portion 5b is hooked and fixed to the fastening bolts 3c and 3d of the retainer 3 protruding from the inner portion of the air bag 1 to the outer portion thereof in such a manner as to surround between both side surfaces of the bag mounting base portion 1b from the outer side, it is possible to prevent a position shift caused by an assembly and it is possible to securely reinforce the bag mounting base portion 1b.

Figure 6:
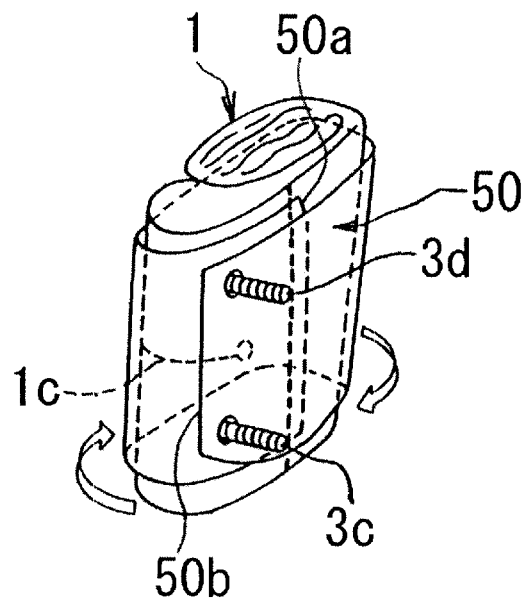
FIG. 6 is a perspective view showing an air bag apparatus in accordance with a second embodiment of the present invention in correspondence to an assembling state of respective parts.
Figure 7:
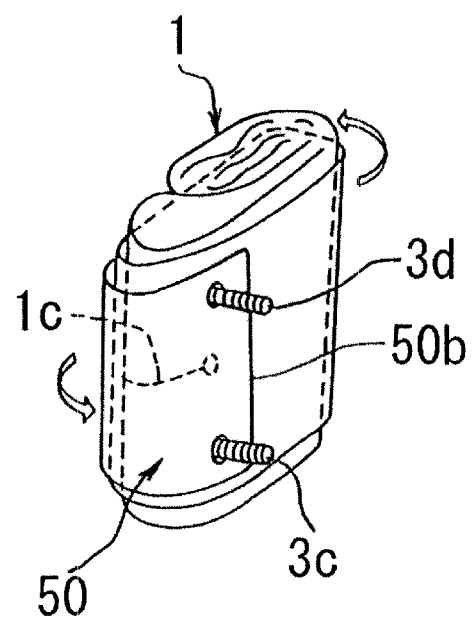
FIG. 7 is a perspective view showing an air bag apparatus in accordance with the second embodiment of the present invention in correspondence to an assembling state of respective parts.

In addition to the embodiment mentioned above, as shown in FIGS. 6 and 7, an external contact fabric 50 may be structured such as to surround a whole of the air bag 1 from the outer side in a state of folding the air bag 1 in such a manner as to be capable of expanding and developing, and to hook and fix the other end portion 50b to the fastening bolts 3c and 3d of the retainer 3 protruding outward from the inner portion of the air bag 1 by through holes 50c and 50d. Accordingly, the external contact fabric 50 is provided for reinforcing the bag mounting base portion 1b and preventing a whole disengagement.

The external contact fabric 50 is provided so as to surround the whole in a clockwise or a counterclockwise from the other end portion 50b by changing position of a sewed side of one end portion 50a to any one of side surfaces of the air bag 1. Since the external contact fabric 50 is provided, the air bag 1 can be compactly arranged and provided with a reduced number of parts in a state of being folded in such a manner as to be expandable and developable.

Figure 8:
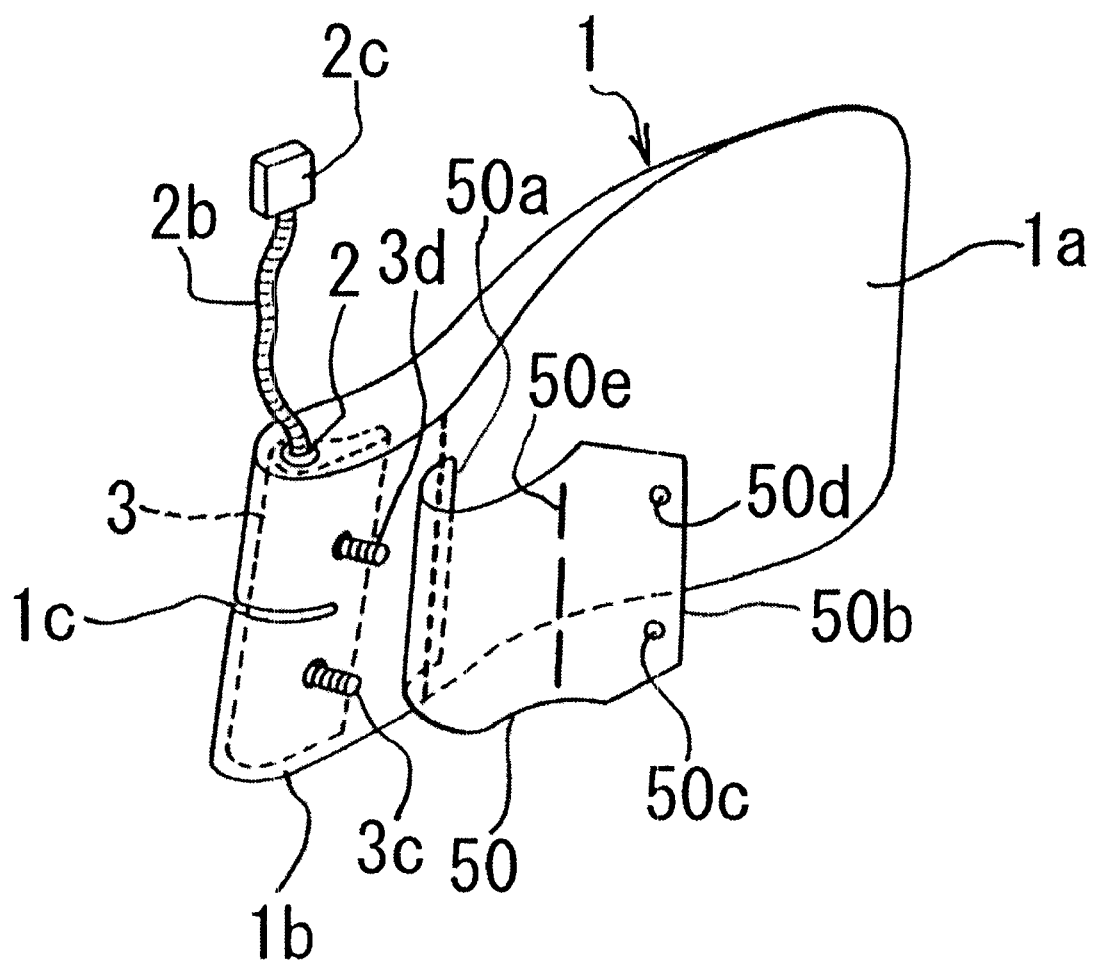
FIG. 8 is a schematic view mainly showing an external contact fabric provided in the air bag apparatuses shown in FIGS. 6 and 7.

In the external contact fabric 50, as shown in FIG. 8, a breaking portion 50e generated together with an expansion and development of the air bag 1 is provided by a plurality of vertically intermitting slits or the like. If the external contact fabric 50 having the breaking portion 50e is provided, it is possible to easily break the external contact fabric 50 due to the expansion pressure of the air bag 1 so as to quickly develop the air bag 1 even when the air bag 1 is folded and wholly surrounded.

Figure 9:
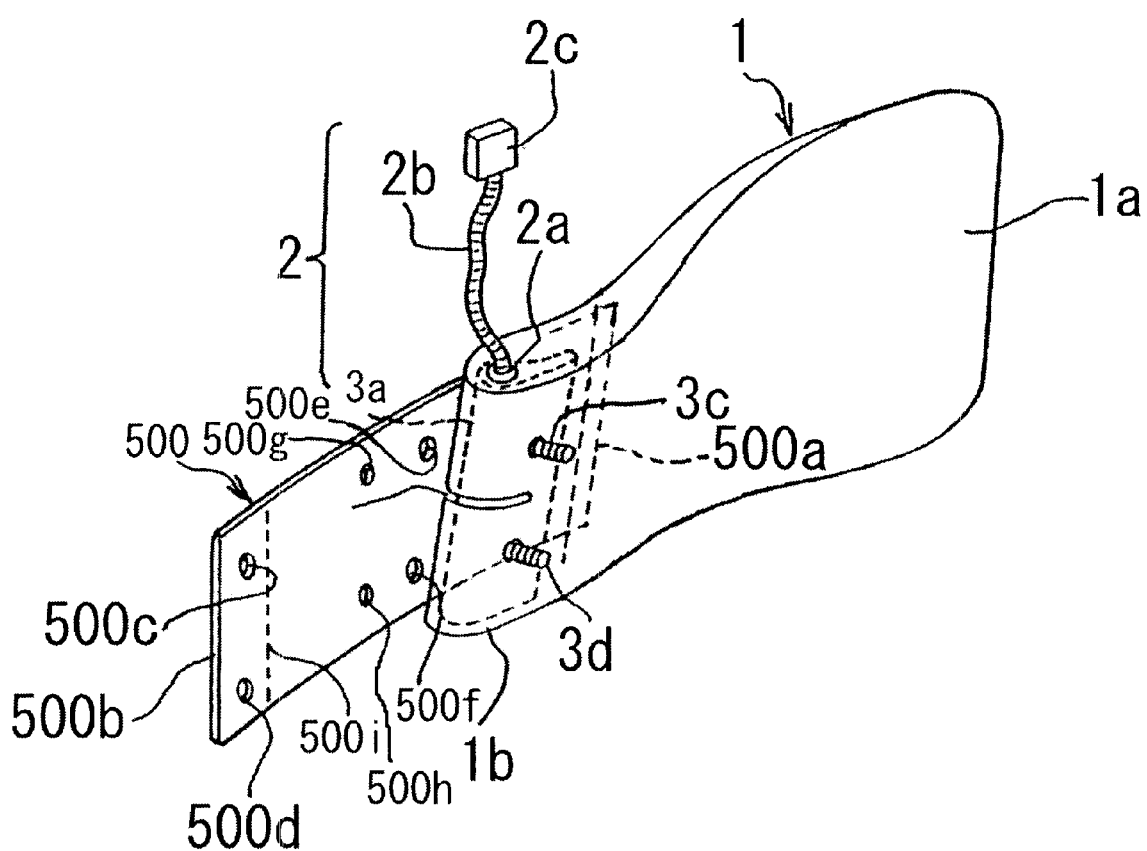
FIG. 9 is a schematic view showing an air bag apparatus in accordance with a third embodiment of the present invention in a state that an air bag is developed.

In place of the external contact fabrics 5 and 50 mentioned above, as shown in FIG. 9, there can be provided an external contact fabric 500 obtained by sewing one end portion 500a to an opposite side surface of the air bag 1 where the fastening bolts 3c and 3d of the retainer 3 protrudes. In the external contact fabric 500, in addition to through holes 500c and 500d of the fastening bolts 3c and 3d provided within a surface of the other end portion 500b, two pairs of through holes 500e, 500f, 500g and 500h are provided in a middle portion with being apart from each other. Further, a breaking portion 500i is provided in a width direction so as to be positioned in a front side in a direction of expanding and developing the air bag 1.

Figure 10:
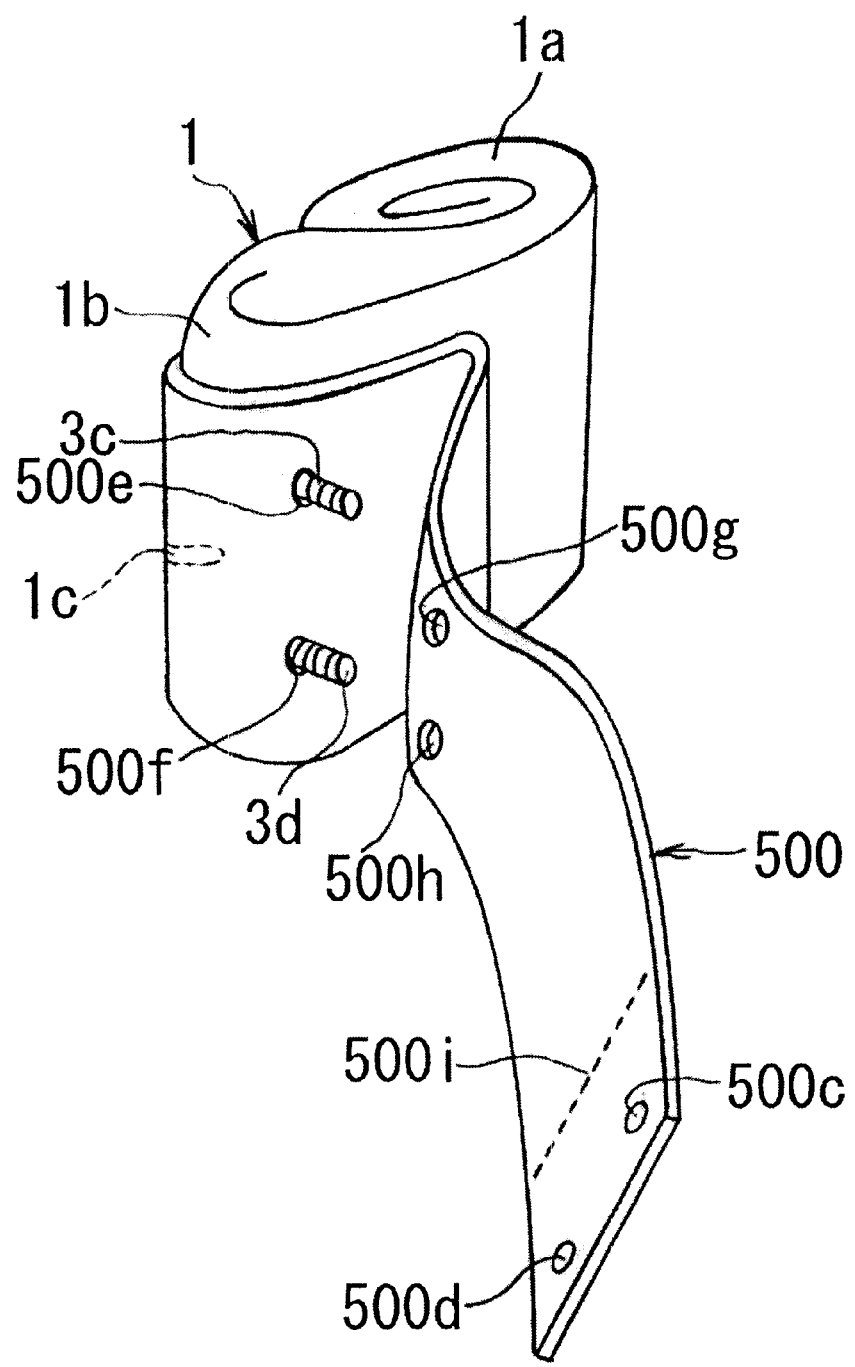
FIG. 10 is a schematic view showing a surrounding procedure of an external contact fabric constituting the air bag apparatus shown in FIG. 9.

In the external fabric 500, as shown in FIG. 10, it is possible to move the external fabric from a fastened side of one end portion 500a to an opposite side surface so as to temporarily engage a middle portion with the fastening bolts 3c and 3d of the retainer 3 by the fastening holes 500e and 500f, return the external fabric from the engaged portion to the fastened side of one end portion 500a so as to again engage the middle portion with the fastening bolts 3c and 3d of the retainer 3 by the through holes 500g and 500h, and doubly surround the bag mounting base portion 1b.

Figure 11:
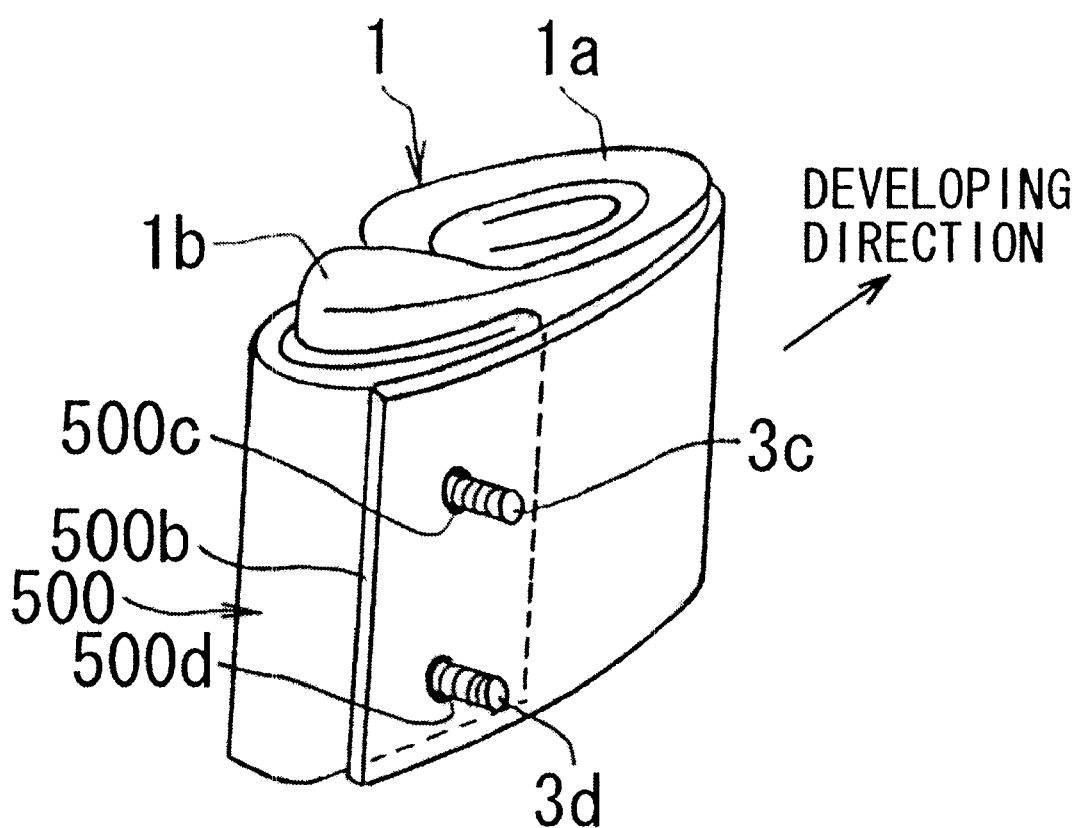
FIG. 11 is a schematic view showing a surrounding structure of the external contact fabric constituting the air bag apparatus shown in FIG. 9 from a base portion side.
Figure 12:
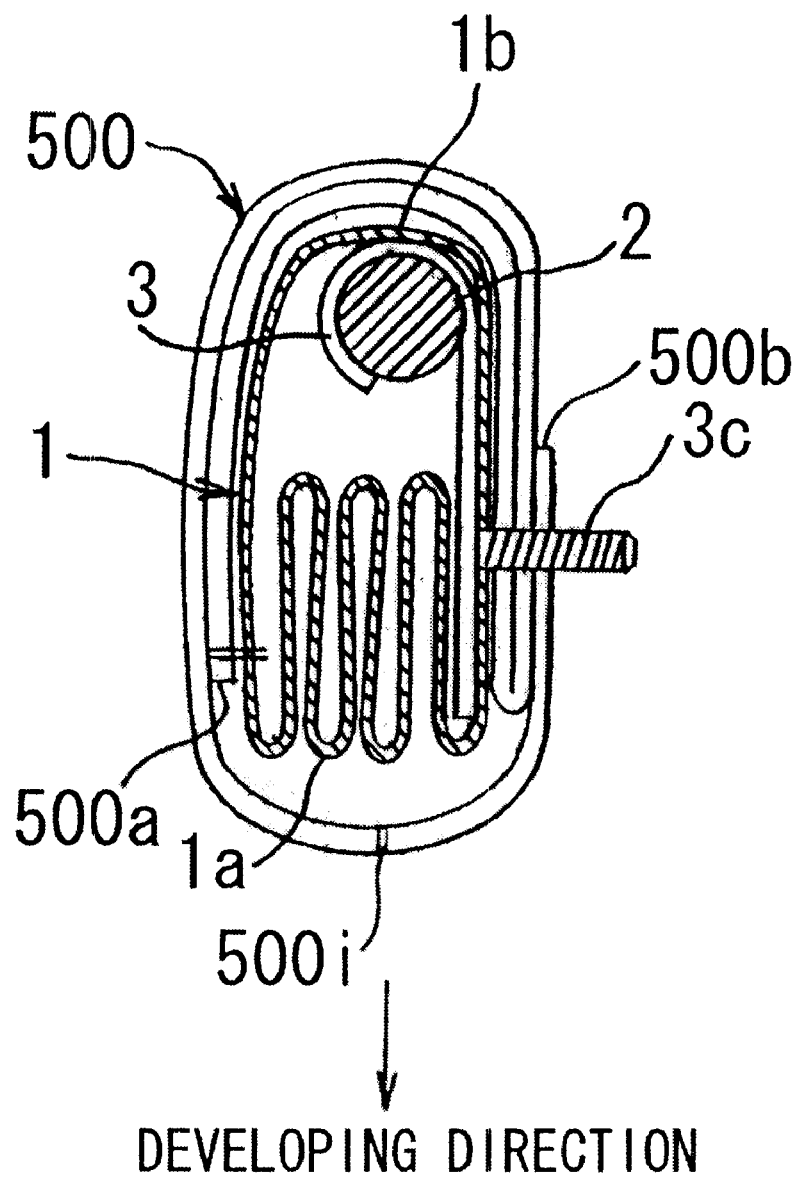
FIG. 12 is a schematic view showing the surrounding structure of the external contact fabric constituting the air bag apparatus shown in FIG. 9 by a cross section.
Figure 13:
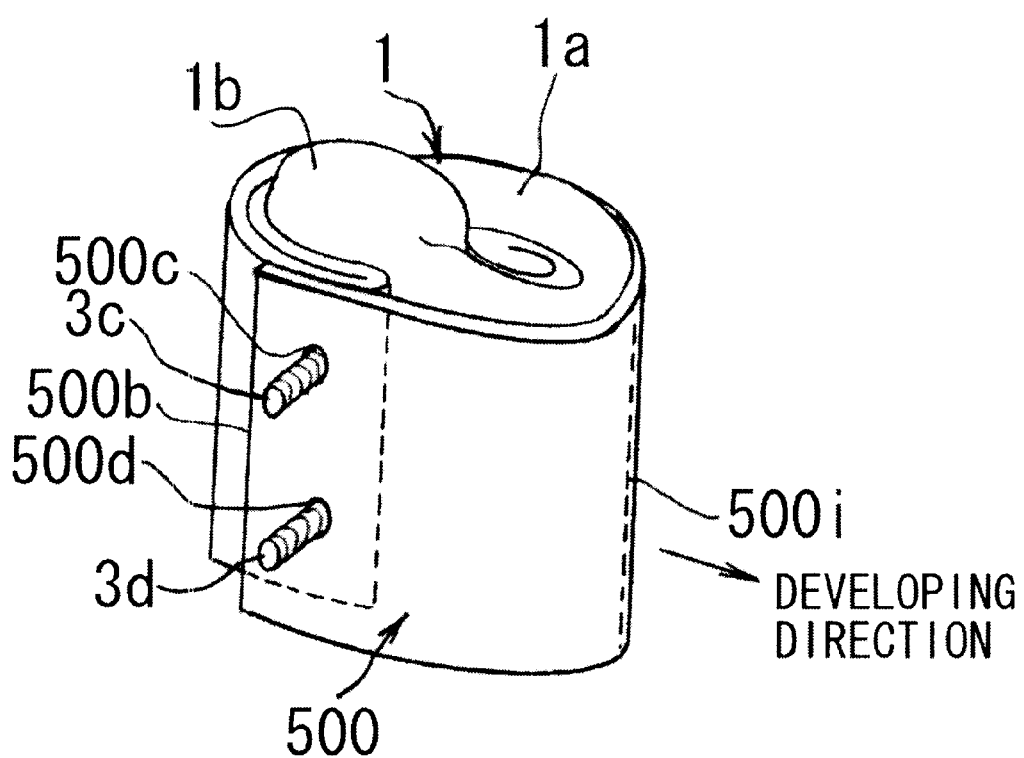
FIG. 13 is a schematic view showing a surrounding structure of a fabric member constituting the air bag apparatus shown in FIG. 9 from a front portion side.

The external contact fabric 500 surrounds the whole of the bag folded from the fastened side of one end portion 500a as shown in FIGS. 11 and 12 and engages the other end portion 500b with the fastening bolts 3c and 3d of the retainer 3 by the through holes 500c and 500d, thereby being assembled as the air bag apparatus. In this assembling state of the air bag apparatus, the breaking portion 500i is positioned in the front side in an expanding and developing direction of the air bag 1 as shown in FIG. 13.

In the air bag apparatus structured in this manner, since the air bag 1 is only folded in such a manner as to expand and develop and the whole of the bag including the inflator 2 is only surrounded by the external contact fabric 500 from the outer side, it is possible to keep the air bag 1 in a proper folded state in the same manner as that mentioned above and it is possible to compactly assemble with a reduced number of parts without being disengaged, whereby it is possible to construct one unit which can be easily assembled and provided within the air bag case.

Further, since the bag mounting base portion 1b is doubly surrounded by the external contact fabric 500 even when the insertion port 1c of the air bag 1 is provided in the bag mounting base portion 1b, it is possible to prevent the gas generated from the inflator 2 from leaking out.

In addition, since the bag mounting base portion 1b is doubly surrounded by the external contact fabric 500 even when the gas pressure is applied to the bag mounting base portion 1b at the beginning of the operation of the inflator 2, the portion is prevented from expanding. Further, since the gas, is mainly applied to the folded bag main body 1a, the bag main body 1a is effectively expanded, and it is possible to concentrically apply the expansion pressure of the bag main body 1a to the breaking portion 500i of the external contact fabric 500.

Accordingly, even when folding the air bag 1 and wholly surrounding the air bag 1 by the external contact fabric 500, it is possible to break the breaking portion 500i of the external contact fabric 500 in a moment together with the expansion and development of the air bag 1 so as to quickly expand and develop the air bag 1. Further, since the breaking portion 500i of the external contact fabric 500 is provided so as to be positioned in the front side in the expanding and developing direction of the air bag 1, it is possible to securely restrict the expanding and developing direction of the air bag 1.

In accordance with the mounting structure for the air bag apparatus, since the base plate portion 3b corresponding to the placing plate for the retainer 3 presses and grips the mounting base portion 1b of the air bag 1, the retainer 3 presses the insertion port 1c of the air bag 1 and is also provided for preventing the gas leakage. Further, since the double-layered portion of the external contact fabric 500 is also pressed and gripped by the base plate portion 3b of the retainer 3 together with the bag mounting base portion 1b, the external contact fabric 500 is also provided for reinforcing the bag mounting base portion 1b which can stand against the expansion and development of the bag main body 1a.

Each of the air bag apparatuses mentioned above can be easily assembled and provided in the inner portion of the air bag case C in such a manner as not to be disengaged by protruding the fastening bolts 3c and 3d of the retainer 3 outward from the bottom portion of the air bag case C as the stationary shaft for the inflator 2. Further, the apparatus can be wholly provided in the inner portion of the seat back B by fastening and fixing the air bag case C to the side plate P of the seat back frame F by the fastening bolts 3c and 3d.

In this case, in the embodiments mentioned above, the description has been given of the structure in which the inflator 2 is held by the retainer 3 and mounted and provided by the fastening bolts 3c and 3d of the retainer 3, however, the present invention can be applied to an air bag apparatus provided with an inflator having the other structures.

As mentioned above, in accordance with the air bag apparatus according to a first aspect of the present invention, since the gas generating inflator for expanding and developing the air bag is assembled in the inner portion from the insertion port provided in the mounting base portion of the air bag, the inflator is received inside within the air bag and the internal contact fabric for closing the insertion port of the mounting base portion from the inner side is provided for preventing the gas leakage, the internal contact fabric is pressure contacted to the inner surface of the mounting base portion due to the application of the expansion pressure of the air bag, so that it is possible to completely seal the insertion port of the mounting base portion and it is possible to prevent the gas generated from the inflator from leaking.

In accordance with the air bag apparatus according to a second aspect of the present invention, since there is provided the internal contact fabric structured such that one end portion is sewed on the inner surface of the air bag, the other end portion is set to the free end so as to receive the inflator inside and the free end is engaged with the stationary shaft of the inflator within the air bag so as to close the insertion port of the mounting base portion from the inner side, the assembly can be easily performed so as to receive the inflator inside the internal contact fabric. Further, it is possible to provide the internal contact fabric along the inner surface side of the mounting base portion and it is possible to prevent a position shift caused by the assembly of the internal contact fabric and the application of the expansion pressure of the air bag, whereby it is possible to securely close the insertion port of the inflator from the inner side.

In accordance with the air bag apparatus according to a third aspect of the present invention, since there is provided the internal contact fabric structured such as to be received inside together with the retainer for holding the inflator and close the insertion port of the inflator from the inner side by pressing from the inner surface side by the retainer, it is possible to extend the internal contact fabric on the inner surface of the mounting base portion by the retainer so as to securely cover the insertion port of the inflator.

In accordance with the air bag apparatus according to a fourth aspect of the present invention, since the external contact fabric structured such as to surround the bag mounting base portion from the outer side is provided for reinforcing the bag mounting base portion, it is possible to press and fix the bag mounting base portion together with the internal contact fabric so as to stand against the expansion pressure and it is possible to securely expand and develop the air bag.

In accordance with the air bag apparatus according to a fifth aspect of the present invention, since the external contact fabric structured such as to surround the whole of the air bag folded in such a manner as to be capable of being expanded and developed from the outer side is provided for reinforcing the bag mounting base portion and preventing the whole from being disengaged, it is possible to compactly assemble and provide with a reduced number of parts in a state of folding the air bag in such a manner as to be capable of expanding and developing.

In accordance with the air bag apparatus according to a sixth aspect of the present invention, since there is provided the external contact fabric structured such that one end portion is sewed on the outer surface of the air bag and the other end portion is engaged with and fixed to the stationary shaft of the inflator protruding from the inner portion of the air bag to the outer portion, it is possible to keep the whole compact in a state of folding the air bag in an expandable and developable manner, and it is possible to prevent a position shift, disengagement or the like caused together with the assembly, whereby it is possible to securely reinforce the bag mounting base portion.

In accordance with the air bag apparatus according to a seventh aspect of the present invention, since the external contact fabric is moved from the fastened side of one end portion to the opposite side surface of the air bag so as to temporarily engage the middle portion with the stationary shaft of the inflator, return to the fastened side of one end portion from the engaged portion so as to again engage the middle portion with the stationary shaft of the inflator, and doubly surround the bag mounting base portion by the external contact fabric, and the free end is engaged with and fixed to the stationary shaft of the inflator by surrounding the folded bag main body, it is possible to keep the air bag in a proper folded state and it is possible to easily assemble the air bag in a compact manner with a reduced number of parts.

Further, since the bag mounting base portion is doubly surrounded by the external contact fabric, it is possible to prevent the gas generated from the inflator from leaking out, and it is possible to prevent the bag mounting base portion from being expanded even when the gas pressure is applied to the bag mounting base portion at an initial operation time of the inflator. Accordingly, the gas pressure can be mainly applied to the folded bag main body so as to effectively expand the bag main body and the expansion pressure of the bag main body can be concentrically applied to the breaking portion, so that it is possible to break the breaking portion of the external contact fabric in a moment so as to quickly expand and develop the air bag.

In accordance with the air bag apparatus according to an eighth aspect of the present invention, there is provided the external contact fabric structured such that the breaking portion is positioned in the front side in the expanding and developing direction of the air bag and provided in the width direction, it is possible to break the breaking portion of the external contact fabric in a moment due to the gas generation of the inflator so as to accurately restrict the expanding and developing direction of the air bag.

What is claimed is:

1. An air bag apparatus adapted to be mounted to supporting means, said air bag apparatus comprising:

an air bag having an outer surface;

a gas generating inflator for expanding and developing said air bag; and an external contact fabric having first and second end portions, and a middle portion;

said air bag having a mounting base portion and an insertion port formed in said mounting base portion for allowing said gas generating inflator to be inserted into said air bag;

said air bag being folded in such a manner as to be capable of being expanded and developed;

said gas generating inflator having mounting means for mounting said air bag apparatus to said supporting means;

said gas generating inflator being positioned within said air bag with said mounting means projecting through a first portion of said folded air bag; and said external contact fabric being fastened at said first end portion thereof onto a second portion of said outer surface of said folded air bag, extending from said second portion of said outer surface of said folded air bag toward said mounting means, folded at said middle portion, engaged at said folded middle portion with said mounting means, returned from said mounting means toward said second portion of said outer surface of said folded air bag to be wound around said folded air bag, and engaged at said second end portion with said mounting means, whereby a whole of said folded air bag is surrounded by said external contact fabric with said mounting base portion being doubly surrounded by said folded middle portion.

2. An air bag apparatus according to claim 1, wherein said external contact fabric has a breaking portion for permitting said external contact fabric to break in response to pressure applied thereto during expansion and development of said air bag.

3. An air bag apparatus according to claim 1, wherein said mounting means includes fastening bolts, said middle portion of said external contact fabric has first through holes, and said second end portion has second through holes, said first and second through holes being engaged with said fastening bolts.

4. An air bag apparatus according to claim 2, wherein said mounting means includes fastening bolts, said middle portion of said external contact fabric has first through holes, and said second end portion has second through holes, said first and second through holes being engaged with said fastening bolts.

5. An air bag apparatus according to claim 1, wherein said supporting means comprises a seat frame.

6. An air bag apparatus according to claim 2, wherein said supporting means comprises a seat frame.

7. An air bag apparatus according to claim 3, wherein said supporting means comprises a seat frame.

8. An air bag apparatus according to claim 4, wherein said supporting means comprises a seat frame.

* * * * *